United States Patent
O'Quin et al.

(10) Patent No.: US 7,121,562 B2
(45) Date of Patent: Oct. 17, 2006

(54) SHOPPING CART BUMPER

(75) Inventors: Taft O'Quin, Inola, OK (US); Nicholas K. Dietzel, Wagoner, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 10/962,924

(22) Filed: Oct. 12, 2004

(65) Prior Publication Data

US 2006/0087091 A1    Apr. 27, 2006

(51) Int. Cl.
*B62D 39/00*    (2006.01)
(52) U.S. Cl. .................. 280/33.992; 293/117; 293/123; 248/345.1
(58) Field of Classification Search ........... 280/33.991, 280/33.992, 33.993, 33.994, 33.995, 33.996, 280/33.997, 33.998, 651, 659; 52/288.1, 52/287.1, 631; 248/345.1; 293/117, 123
See application file for complete search history.

(56) References Cited

U.S. PATENT DOCUMENTS

| | | | |
|---|---|---|---|
| 4,600,204 A | 7/1986 | Badger | |
| 4,883,281 A | 11/1989 | Waterman | |
| 4,999,233 A * | 3/1991 | Probst et al. | 248/345.1 |
| 5,020,811 A | 6/1991 | Ondrasik | |
| 5,074,570 A * | 12/1991 | Ferris et al. | 280/33.995 |
| 5,131,669 A | 7/1992 | Kinnamon et al. | |
| 5,289,936 A * | 3/1994 | Jones et al. | 280/33.991 |
| 5,603,140 A * | 2/1997 | Pryce | 248/345.1 |
| 5,836,422 A * | 11/1998 | Hurst | 280/33.991 |
| 6,126,181 A * | 10/2000 | Ondrasik | 280/33.991 |
| 6,644,674 B1 * | 11/2003 | Simard | 280/33.991 |

FOREIGN PATENT DOCUMENTS

JP    2000184941 A  *  7/2000

* cited by examiner

*Primary Examiner*—Hau Phan
(74) *Attorney, Agent, or Firm*—Wood, Phillips, Katz, Clark & Mortimer

(57) ABSTRACT

A shopping cart has a wire basket, which comprises generally horizontal and generally vertical wires defining two side walls, defining a front wall, and defining multiple apertures in each of the side and front walls, and in which the front wall meets each of the side walls along a generally vertical front corner. A bumper, which is installed on the wire basket, along the front corner, has an elongate body, which wraps around the front corner and which has two lateral edges. Along a lower portion of each lateral edge, the bumper has a wing projecting into at least one of the apertures of the side and front walls. The wing has a recess, which accommodates a given one of the horizontal wires of the wire basket, and portions of the wing project into apertures above and below the given one of the horizontal wires.

4 Claims, 1 Drawing Sheet

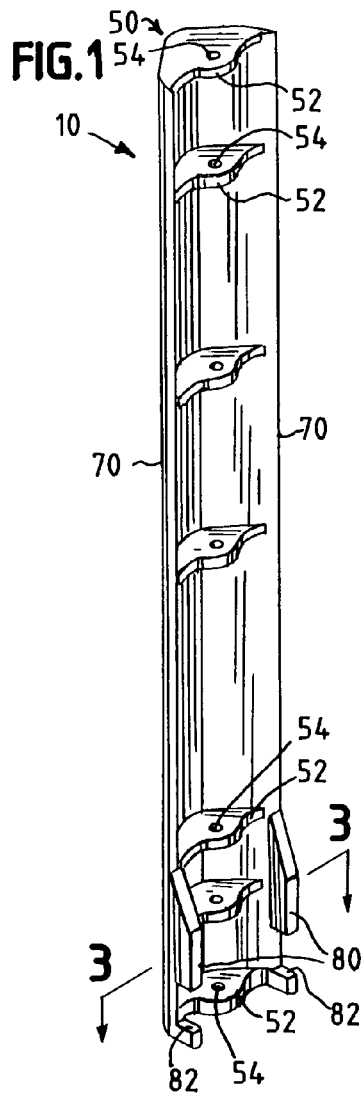
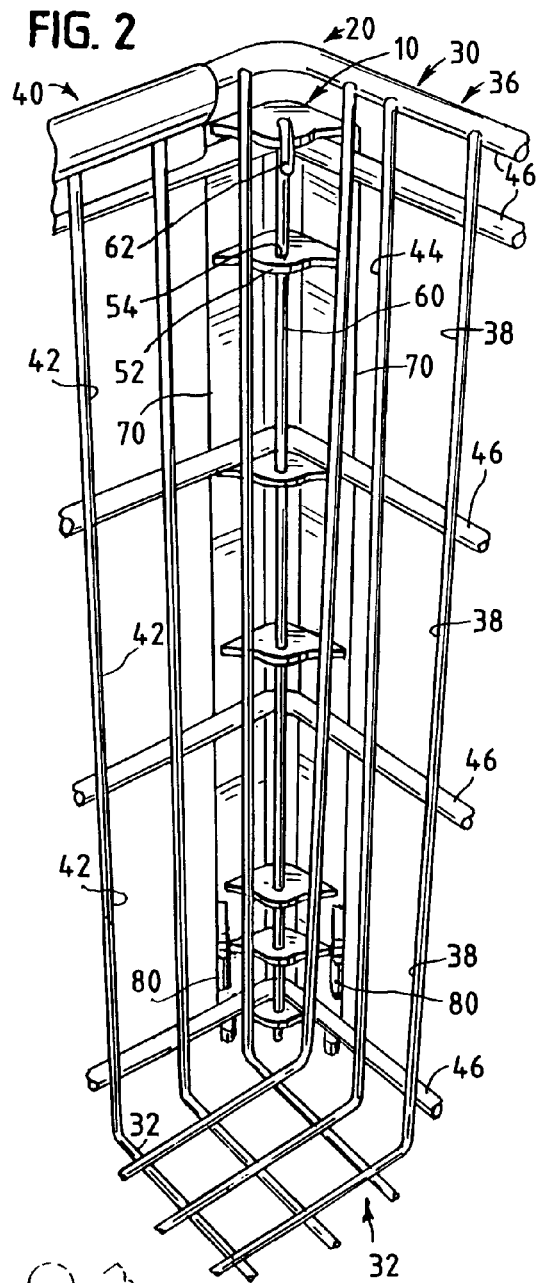
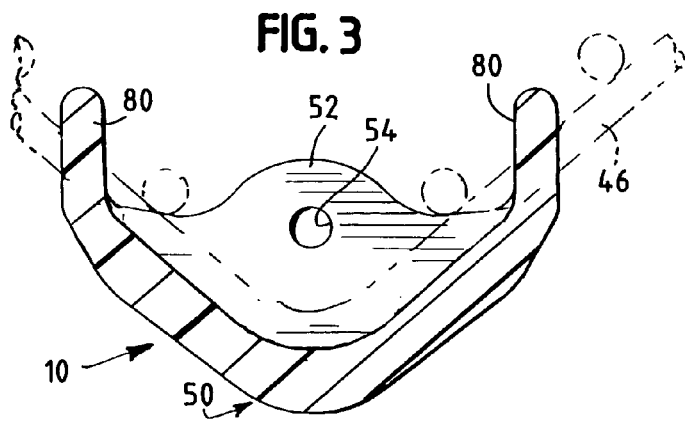

SHOPPING CART BUMPER

TECHNICAL FIELD OF THE INVENTION

This invention pertains to a bumper, which useful alomg a front corner of a wire basket of a shopping cart, and to a shopping cart having such a bumper protecting each front corner of such a basket.

BACKGROUND OF THE INVENTION

A shopping cart of a type in widespread use comprises a wheeled chassis, a handle structure, and a wire basket, which comprises generally horizontal and vertical wires defining two side walls, defining a front wall, and defining multiple apertures in each of the side and front walls, and in which the front wall meets each of the side walls along a generally vertical front corner. Commonly, resilient bumpers are installed along the front corners of the wire basket.

U.S. Pat. No. 4,883,281, the disclosure of which is incorporated by reference herein, exemplifies a resilient bumper, as installed along a front corner of a wire basket of a shopping cart of the type noted above. The resilient bumper has an elongate body, which wraps around the front corner. The elongate body has two lateral edges, each of which ends at a lower corner.

Because the lower corners remain outside the apertures defined by the side and front walls when the resilient bumper is installed, one of the lower corners can be sometimes hooked over a vertical wire of the wire basket of a similar cart, into which the shopping cart is nested, whereupon the bumper can be sometimes pulled off or can be sometimes ripped when the shopping car is pulled from the similar cart.

U.S. Pat. No. 5,131,669, the disclosure of which is incorporated by reference herein, exemplifies a bumper of related interest, as installed along a front corner of a wire basket of a shopping cart of the type noted above.

SUMMARY OF THE INVENTION

This invention provides, for a shopping cart of the type noted above, a bumper, which is adapted to be installed on the wire basket, along the front corner. The bumper has an elongate body, which is adapted to wrap around the front corner when the bumper is installed and which has two lateral edges.

This invention contemplates that along at least one of the lateral edges, along a portion that becomes a lower portion of the same one of the lateral edges when the bumper is installed, the bumper has a wing, which is adapted to project into at least one of the apertures of the side and front walls when the bumper is installed.

Preferably, the wing has a recess, which is adapted to accommodate a given one of the horizontal wires of the wire basket when the bumper is installed, and portions of the wing are adapted to project into apertures above and below the given one of the horizontal wires when the bumper is installed.

This invention also provides a shopping cart of the type noted above, wherein the shopping cart has a bumper, as described in the preceding three paragraphs.

BRIEF DESCRIPTION OF THE DRAWINGS

FIG. 1 is a perspective view of a bumper having an elongate body and embodying this invention, as viewed from within and from one side of the elongate body.

FIG. 2 is a fragmentary, perspective view illustrating how the bumper coacts with generally horizontal and vertical wires of a wire basket of a shopping cart of the type noted above.

FIG. 3 is a sectional view, which is taken along line 3—3 of FIG. 1, in a direction indicated by arrows. In FIG. 3, some of the wires of the wire basket are illustrated fragmentarily, in broken lines.

DETAILED DESCRIPTION OF THE ILLUSTRATED EMBODIMENT

A bumper 10 embodying this invention is molded from a resilient, polymeric material, such as polyurethane having a suitable durometer or such as poly(vinyl chloride) having a suitable durometer. The bumper 10 is adapted to be installed and is illustrated in FIG. 2 as having been installed along a front corner 20 of a wire basket 30 of a shopping cart of the type noted above.

The wire basket 30 comprises generally horizontal and vertical wires defining a bottom wall, two side walls, and a front wall and defining multiple apertures in each of the side and front walls. In FIG. 2, the bottom wall 32 defining multiple apertures 34, one side wall 36 defining multiple apertures 38, and the front wall 40 defining multiple apertures 42 are illustrated fragmentarily. In FIG. 2, the front wall 40 is illustrated as meeting the side wall 36 along the front corner 20, along which the front wall 40 and the side wall 36 define a generally vertical column of corner apertures 44.

Except as illustrated and described herein, details of the shopping cart are outside the scope of this invention. Except as illustrated and described herein, the shopping cart is similar to shopping carts known heretofore, such as the shopping cart illustrated and described in U.S. Pat. No. 5,131,669, supra, and such as shopping carts available commercially from Unarco Industries, Inc. of Wagoner, Okla.

The bumper 10 is molded so as to have an elongate body 50, which is adapted to wrap around and is illustrated in FIG. 2 as wrapping around the front corner 20, and so as to have a series of unitary mounting flanges 52, each of which fits into one of the corner apertures 44 when the bumper 10 is installed. Each mounting flange 52 has a hole 54. The holes 54 of the respective flanges 52 are aligned with one another. When the bumper 10 is installed, a rod 60 is inserted downwardly through the aligned holes 54, inwardly of multiple horizontal wires 46 of the wire basket 30. A hook 62 formed at the upper end of the rod 60 prevents the rod 60 from dropping through the aligned holes 54. A generally similar arrangement of unitary mounting flanges and a rod is disclosed in U.S. Pat. No. 4,883,281, supra.

The elongate body 50 has two lateral edges 70, which are adapted to remain outside the apertures 38, 42, of the side and front walls 36, 40, when the bumper 10 is installed on the wire basket 20 except that along each lateral edge 70, along a portion that becomes a lower portion of said lateral edge 70 when the bumper 10 is installed, this invention contemplates that the bumper 10 has a wing 80.

Each wing 80 has a recess 82 accommodating a given one of the horizontal wires 46 of the wire basket 30. Thus, when the bumper 10 is installed, the upper portions 84 of the wings 80, above the recesses 82, project into apertures 38, 42, above the same one of the horizontal wires 46 while the lower portions 86 of the wings 80, below the recesses 82, project into apertures 38, 42, below the same one of the horizontal wires 46.

Because the lower portions 86 project into apertures 38, 42, in the side and front walls 36, 40, those portions 86, which constitute the lowermost portions of the bumper 10, cannot be easily hooked onto any of the vertical wires of the wire basket of a similar cart, into which the shopping cart having bumper 10 installed along the front corner 20 of the wire basket 30 is nested.

The invention claimed is:

1. A bumper kit for a shopping cart having a wire basket having generally horizontal and generally vertical wires, the generally horizontal and generally vertical wires defining two side walls, defining a front wall, and defining multiple apertures in each of the side and front walls between said generally vertical wires, the front wall meeting each of the side walls along a generally vertical corner,
    wherein the bumper kit comprising a bumper, which is adapted to be installed on the wire basket, along the front corner, comprises an elongate body, which is adapted to wrap around the front corner when the bumper is installed and which has two lateral edges, and wherein along at least one of the lateral edges, along a portion that becomes a lower portion of the same one of the lateral edges when the bumper is installed, the bumper has a wing, which extends directly from said at least one of the lateral edges at the lower portion, which is adapted to project into at least one of the apertures of the side and front walls when the bumper is installed.

2. The bumper kit of claim 1, wherein the wing has a recess, which is adapted to accommodate a given one of the generally horizontal wires of the wire basket when the bumper is installed, and wherein portions of the wing are adapted to project into apertures above and below the given one of the generally horizontal wires when the bumper is installed.

3. A bumper kit for a shopping cart having a wire basket having a wire basket having generally horizontal and generally vertical wires the generally horizontal and generally vertical wires defining two side walls, defining a front wall, and defining multiple apertures in each of the side and front walls, between said generally vertical wires, the front wall meeting each of the side walls along a generally vertical corner,
    wherein the bumper, which is adapted to be installed on the wire basket, along the front corner, comprises an elongate body, which is adapted to wrap around the front corner when the bumper is installed and which has two lateral edges, which are adapted to remain outside the apertures of the side and front walls when the bumper is installed on the wire basket except that along each lateral edge, along a portion that becomes a lower portion of said lateral edge when the bumper is installed, the bumper has a wing, which extends directly from said at least one of the lateral edges at the lower portion, which is adapted to project into at least one of the apertures of the side and front walls when the bumper is installed.

4. The bumper kit of claim 3, wherein the wing has a recess, which is adapted to accommodate a given one of the generally horizontal wires of the wire basket when the bumper is installed, and wherein portions of the wing along each lateral edge of the bumper are adapted to project into apertures above and below the given one of the generally horizontal wires when the bumper is installed.

* * * * *